Figure 1:
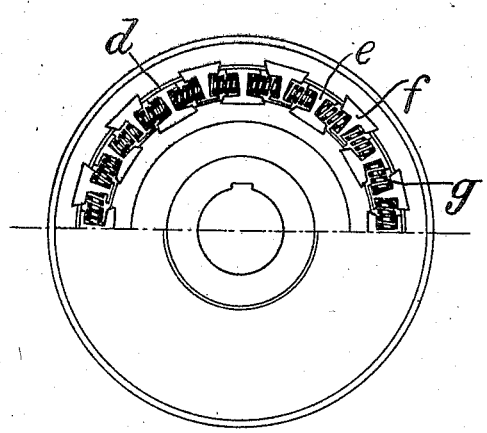

Feb. 20, 1923.  
C. J. BELLI.  
RESILIENT AND ELECTRICALLY INSULATING COUPLING FOR ELECTRIC MACHINES.  
FILED APR. 4, 1922.

1,446,287.

Inventor.  
Charles Joseph Belli  
By Serrell  
his Attorneys.

Patented Feb. 20, 1923.

1,446,287

UNITED STATES PATENT OFFICE.

CHARLES JOSEPH BELLI, OF GENEVA, SWITZERLAND, ASSIGNOR OF ONE-HALF TO THE FIRM SOCIETE ANONYME DES ATELIERS DE SECHERON, OF SECHERON, NEAR GENEVA, SWITZERLAND.

RESILIENT AND ELECTRICALLY INSULATING COUPLING FOR ELECTRIC MACHINES.

Application filed April 4, 1922. Serial No. 549,635.

*To all whom it may concern:*

Be it known that I, CHARLES JOSEPH BELLI, citizen of Switzerland, residing at Geneva, in the Confederation of Switzerland, have invented certain new and useful Improvements in Resilient and Electrically Insulating Couplings for Electric Machines, of which the following is a specification.

This invention relates to a resilient and electrically insulating coupling particularly for machines of the high voltage direct current series system.

In electric power transmission on the series system with high voltage direct current, the generators and the motors are connected in series in a closed circuit. The electric potentials of the generators are added together and those of the motors subtracted in the sequence in which they are switched into the circuit, and form potential waves the maxima of which relatively to the earth can reach high values. As it is impossible in practice to insulate the windings of machines for such high potentials, a double insulation is used, one between the machine frame and the earth and the other between the windings and the machine.

As the machine frames are insulated from the earth, the shafts of a driving and of a driven machine must be connected together by an electrically well insulated coupling. The insulation must be provided for the high potential difference which may be obtained between the ends of the shafts.

If the insulating coupling is made rigid, that is to say non-resilient, great difficulties are found when it is desired to bring to the same permanent level the axes of the shafts which are to be coupled together. It happens that the series machine, which is insulated from the earth, assumes its definite position only after a certain period of working. Generally it sinks a little relatively to the machine which is not insulated and placed fast on concrete. If for that reason the axes of the coupled machines are no longer in line, the load on the bearings becomes irregular and abnormal heating and mechanical oscillations are to be feared.

Another drawback of the rigid insulating coupling is that in case of a short circuit in the conductor, or of sparking on the collectors, it is temporarily exposed to heavy load or stresses.

On the contrary, if the insulating coupling is made springy the load or stresses in the above mentioned cases remains slight as only a part of the excess of the same is transmitted from one machine to the other. The other part of the momentary overload is converted into vis viva owing to the possibility of relative movement of the two rotating armatures which form masses.

The elasticity of the coupling must not be due to the insulating material, for instance cables, belts, etc., as is the case in the usual insulating couplings, for the insulating material is injuriously affected thereby and must be replaced after a certain time. Such couplings are moreover elastic only to a slight degree, and are exposed to fairly heavy momentary stresses.

The coupling according to the invention complies with the above conditions and is characterized by a rigid tube of insulating material which provides for the insulation of the parts to be coupled together, and by springy or elastic elements which are inserted between the said tube and the parts to be coupled together, for the purpose of producing a sufficient elasticity of the coupling and rendering possible a non-concentric position of the parts to be coupled together.

A construction according to the invention is illustrated by way of example in the accompanying drawing in which—

Figure 2:
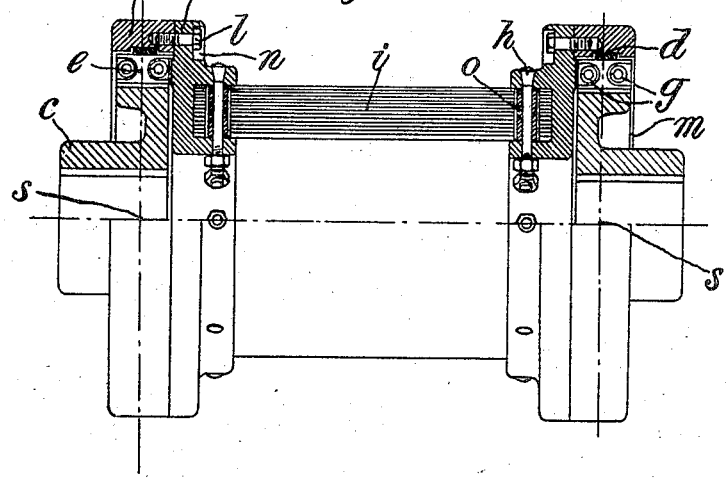

Figure 1. is a side elevation of the said construction with the covering plate in the upper half removed and Figure 2. is a plan partly in longitudinal axial section.

On each end of the rigid tube $i$ of the insulating material is secured a metal rim $a$—$b$ consisting of two separate parts $a$ and $b$ held together by screws $l$. The heads of the screws $l$ are countersunk into a circular notch $n$ of the part $b$. The part $a$ is secured to the tube $i$ by means of screw bolts $h$ passing through the metal parts screwed into the tube $i$. The part $a$ is provided with inner teeth $f$.

On the opposite not shown ends of the shafts to be coupled are shrunk the metal rims $c$ provided on their outer circumference with metal teeth $e$ disposed between the teeth $f$ of the corresponding metal rims $a$—$b$. Between the teeth $e$ and $f$ helical springs $g$ are interposed which transmit the stresses from one rim to the other.

The circumferential surface of the teeth $e$ are of spherical shape with the centre in the axis $s$ of the shaft to be coupled. The rim $a$—$b$ is provided opposite to the teeth $a$ with a curved notch. Between the bottom surface of this notch and the spherical shaped surface of the teeth $e$ are arranged metal parts $d$, for instance of bronze of a generally prismatic shape with rectangular bases, of which the outer base is of a cylindrical shape corresponding to the bottom surface of the notch whilst the inner base has the shape of a part of a spherical zone having its centre in $s$. The metal parts $d$ are allowed to freely slide about parallelly to the axes of the shafts.

As shown in the drawing, these metal parts allow that the shafts may be brought in line, that the shafts are given a certain longitudinal play, that the axes of either of the shafts and that of the insulating tube are enclosing an obtuse angle and that the metal rims $a$—$b$ may slide upon the teeth $e$.

Having now described the nature of my invention and the manner in which it may be put in practice I declare that what I claim is the following:

1. In a resilient and electrically insulating coupling for electrical machines a rigid tube of insulating material arranged between the shafts of the two machines to be coupled together, a springed or elastic element inserted between the said tube and the parts to be coupled together, said springy or elastic element being adapted to provide a reciprocal elasticity of the two shafts in their direction of rotation and also allow of a non-concentric position of the parts to be coupled together.

2. In a resilient and electrically insulating coupling for electrical machines a rigid tube of insulating material arranged between the shafts of the two machines to be coupled together, metal rims on both sides of said insulating tube and rigidly fastened to the latter, said metal rims being provided with teeth, an intermediary member fixed upon the shafts to be coupled together, said intermediary member being provided on its circumference with teeth, springy or elastic elements inserted between the teeth of said metal rims and the teeth of said intermediary member, said springy or elastic elements being arranged in planes transversely situated relatively to the axis of the coupling.

3. In a resilient and electrically insulating coupling for electrical machines a rigid tube of insulating material arranged between the shafts of the machines to be coupled together, metal rims on both sides of said insulating tube and rigidly fastened to the latter, said metal rims being provided with teeth, an intermediary member fixed upon the shafts to be coupled, said intermediary member being provided on its circumference with teeth having a top surface directed towards the metal rim which is concentric to the axis of said intermediary member, metal members which are inserted loosely between said concentric surface and the surrounding metal rim, said metal members being adapted to slide in the direction of the axis of the insulating tube, springy or elastic elements being arranged between the teeth of the said metal rims and the teeth of the intermediary member in planes situated transversely to the axis of the coupling.

In testimony whereof I have affixed my signature in presence of two witnesses.

CHARLES JOSEPH BELLI.

Witnesses:
 ROD. DE WURSTUNBERGER,
 EDW. EMMENEUEL.